US008056296B2

(12) United States Patent
Cairo

(10) Patent No.: US 8,056,296 B2
(45) Date of Patent: Nov. 15, 2011

(54) METHODS AND APPARATUS FOR ASSEMBLING WIND TURBINE TOWERS

(75) Inventor: Ronald Ralph Cairo, Greer, SC (US)

(73) Assignee: General Electric Company, Schenectady, NY (US)

( * ) Notice: Subject to any disclaimer, the term of this patent is extended or adjusted under 35 U.S.C. 154(b) by 495 days.

(21) Appl. No.: 11/399,829

(22) Filed: Apr. 7, 2006

(65) Prior Publication Data

US 2007/0245680 A1 Oct. 25, 2007

(51) Int. Cl.

| | |
|---|---|
| ***E04H 12/00*** | (2006.01) |
| ***E04H 12/20*** | (2006.01) |
| ***E04C 3/00*** | (2006.01) |
| ***H01Q 1/10*** | (2006.01) |

(52) U.S. Cl. ... 52/651.01; 52/40; 52/651.07; 52/651.02; 52/148; 52/848; 52/146; 343/901

(58) Field of Classification Search ............... 29/897.31; 52/651.01, 745.04, 720.1, 726.1, 726.3, 40, 52/445.18, 736.1, 736.2, 736.3, 736.4, 651.07, 52/721.1, 623, 651.02, 148, 118, 297, 292, 52/848, 146; 290/55, 44; 446/244; 361/601; 343/883, 901

See application file for complete search history.

(56) References Cited

U.S. PATENT DOCUMENTS

| | | | | |
|---|---|---|---|---|
| 232,360 | A * | 9/1880 | Milliken | 52/848 |
| 1,982,569 | A * | 11/1934 | Byrd | 52/298 |
| 4,134,707 | A * | 1/1979 | Ewers | 415/4.2 |
| 6,278,198 | B1 | 8/2001 | Willis et al. | |
| 6,470,645 | B1 | 10/2002 | Maliszewski et al. | |
| 6,505,785 | B2 | 1/2003 | Willis et al. | |
| 6,522,025 | B2 | 2/2003 | Willis et al. | |
| 6,614,125 | B2 | 9/2003 | Willis et al. | |
| 6,782,667 | B2 | 8/2004 | Henderson | |
| 6,800,956 | B2 | 10/2004 | Bartlett | |
| 6,888,264 | B1 | 5/2005 | Willis et al. | |
| 6,955,025 | B2 | 10/2005 | Dehlsen et al. | |
| 6,979,175 | B2 | 12/2005 | Drake | |
| 7,042,109 | B2 | 5/2006 | Gabrys | |
| 7,138,961 | B2 | 11/2006 | Sievert | |
| 7,183,664 | B2 | 2/2007 | McClintic | |
| 7,198,453 | B2 | 4/2007 | Hall | |
| 2003/0147753 | A1 * | 8/2003 | Ollgaard | 416/244 A |
| 2005/0166521 | A1 * | 8/2005 | Silber | 52/633 |
| 2007/0256388 | A1 * | 11/2007 | Ianello et al. | 52/651.07 |
| 2008/0145232 | A1 * | 6/2008 | Ollgaard | 416/244 A |

FOREIGN PATENT DOCUMENTS

| | | |
|---|---|---|
| GB | 2203767 A * | 10/1988 |

* cited by examiner

*Primary Examiner* — Brian Glessner
*Assistant Examiner* — Omar Hijaz
(74) *Attorney, Agent, or Firm* — Armstrong Teasdale LLP

(57) ABSTRACT

A method of assembling a wind turbine tower is provided, wherein the method includes providing a plurality of tower members having a top end and a bottom end, and coupling the bottom end of a first tower member to the top end of a second tower member such that the bottom end of the first tower member is interlocked within at least a portion of the top end of the second tower member. The method also includes coupling at least one support member to each of the plurality of tower members.

16 Claims, 9 Drawing Sheets

METHODS AND APPARATUS FOR ASSEMBLING WIND TURBINE TOWERS

BACKGROUND OF THE INVENTION

This invention relates generally to wind turbine towers, and, more particularly, to methods and apparatus for assembling wind turbine towers.

At least some known wind turbine towers include a plurality of sections coupled on top of one another to form the tower. Generally, adjacent sections are welded around a perimeter of a joint defined between the adjoining sections to form a unitary structure. Often, however, the welds may be subjected to flexural stresses caused by loads within the tower or induced to the tower during turbine operation. Specifically, high winds acting on the tower may cause increased flexural stresses, and/or the weight of the turbine at the top of the tower and/or the operation of the turbine may induce high cycle vibrational flexural stresses within the tower. Over time, a combination of these factors may cause the welds to be subjected to high tensile stresses, which may increase the probability of cracks initiating and propagating at the welds. Weld cracking may reduce the life span of the turbine tower, which in-turn may increase costs associated with maintaining the tower.

BRIEF DESCRIPTION OF THE INVENTION

In one aspect, a method of assembling a wind turbine tower is provided, wherein the method includes providing a plurality of tower members having a top end and a bottom end, and coupling the bottom end of a first tower member to the top end of a second tower member such that the bottom end of the first tower member is interlocked within at least a portion of the top end of the second tower member. The method also includes coupling at least one support member to each of the plurality of tower members.

In another aspect, a wind turbine tower is provided, wherein the wind turbine tower includes a plurality of tower members each comprising a top end and a bottom end. A bottom end of a first tower member is coupled to a top end of a second tower member such that the first tower member bottom end is interlocked within at least a portion of the second tower member top end. The wind turbine tower also includes at least one support member coupled to each of the plurality of tower members.

In a further aspect, a wind turbine tower is provided, wherein the wind turbine tower includes at least two primary triangular members each formed from a unitary member and a secondary triangular member formed from the at least two primary triangular members.

DETAILED DESCRIPTION OF THE INVENTION

Figure 1:
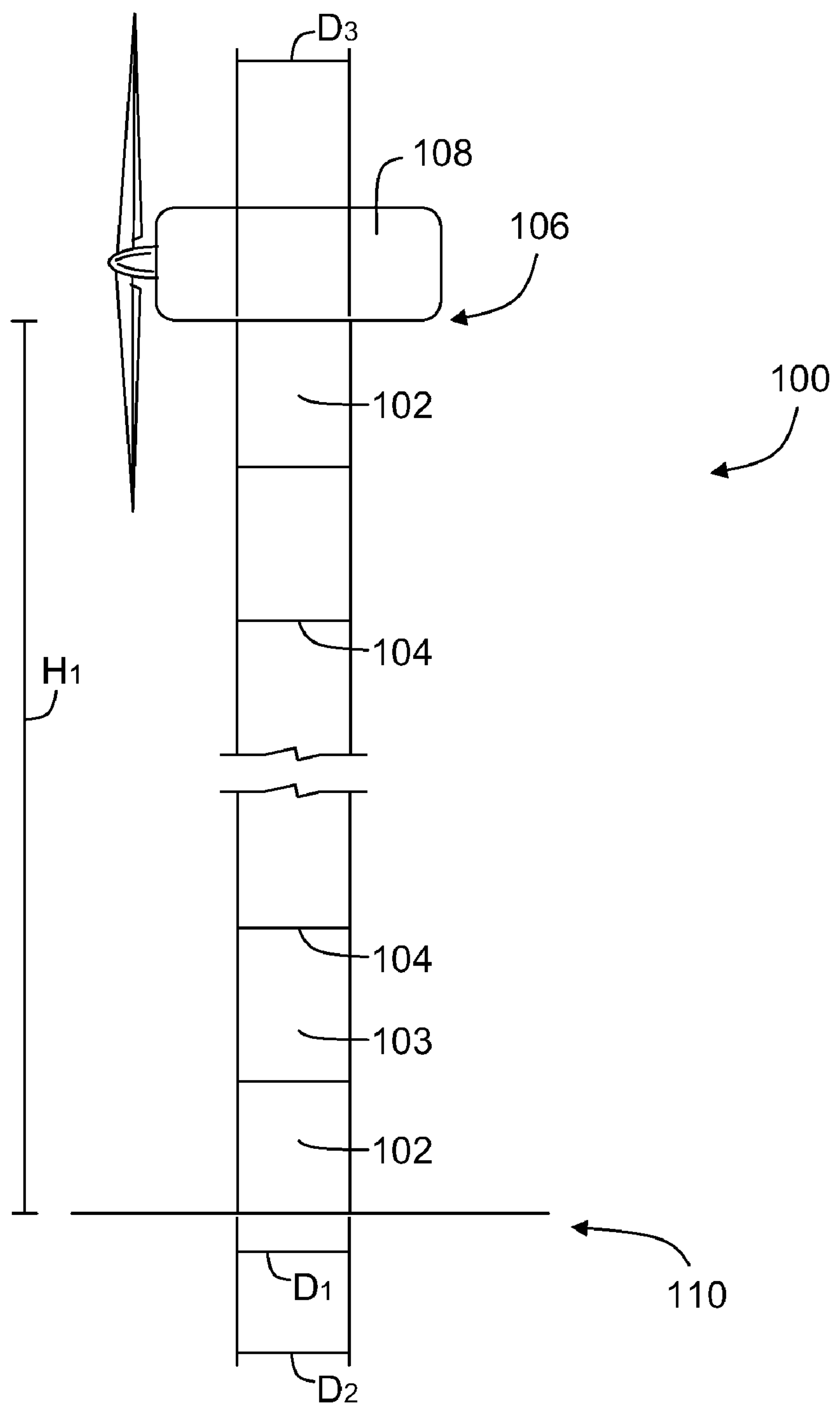
FIG. 1 is a schematic view of an exemplary wind turbine tower.

FIG. 1 is a view of an exemplary wind turbine tower 100. In the exemplary embodiment, tower 100 includes a plurality of substantially circular tower members 102 stacked on top of one another such that tower 100 extends a height $H_1$ above the ground. In an alternative embodiment, tower members 102 are not circular. Each tower member 102 is coupled to adjacent tower members 102 by a weld 104 that circumscribes each member 102. As such, welds 104 couple tower members 102 together to form a unitary tower 100. A top end 106 of tower 100 provides a support for a wind turbine 108.

In the exemplary embodiment, tower members 102 are substantially identical and each has a diameter $D_1$. As such, in the exemplary embodiment, a base 110 of tower 100 has a diameter $D_2$ that is equal to a diameter $D_3$ of tower top end 106, and diameter $D_1$ is substantially constant throughout tower height $H_1$. In an alternative embodiment, base 110 has a diameter $D_2$ that is larger than a diameter $D_3$ of tower top end 106, such that tower 100 tapers from base 110 to top end 106 along tower height $H_1$.

Figure 2:
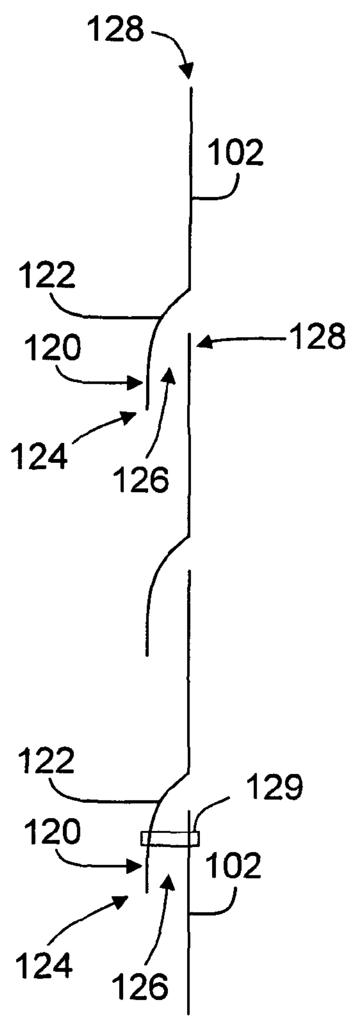
FIG. 2 is a schematic view of a coupling mechanism used with the tower shown in FIG. 1.
Figure 3:
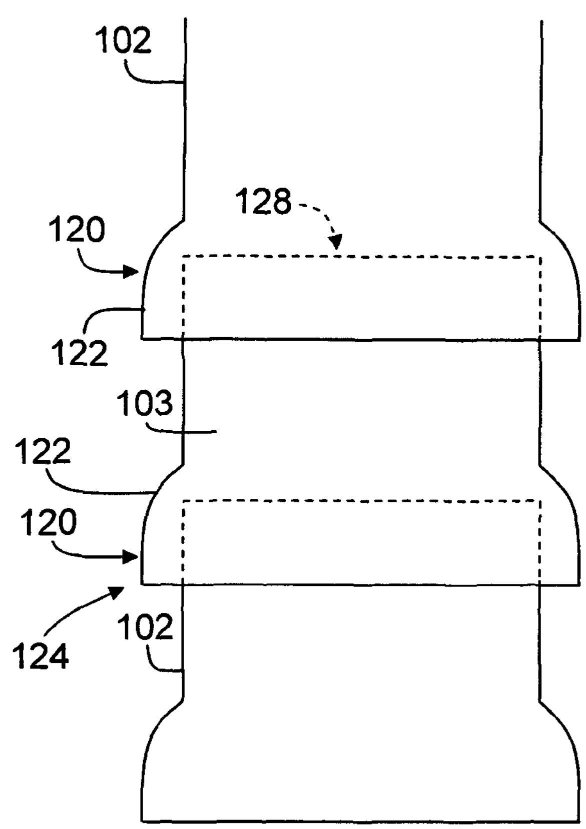
FIG. 3 is a schematic view of the tower shown in FIG. 1 using the coupling mechanism shown in FIG. 2.

FIG. 2 is a schematic view of an exemplary coupling mechanism 120 that may be used with tower members 102. FIG. 3 is a schematic view of a plurality of tower members 102 assembled using coupling mechanism 120. Specifically, coupling mechanism 120 includes a protrusion 122 that extends generally radially outward at a bottom end 124 of each tower member 102. In the exemplary embodiment, each protrusion 122 extends circumferentially around each tower member 102, such that an annular notch 126 is defined at bottom end 124. A top end 128 of a first tower member 102 is sized and shaped to be received in notch 126 of adjacent tower member 102, such that a second tower member 103 is above, and interlocks with the first tower member 102. In an alternative embodiment, at least one bolt 129 may be extended through second tower member protrusion 122 and first tower member top end 128 to increase the structural integrity of a joint 130 formed by interlocking first tower member 102 and second tower member 103. A plurality of tower members 102 are interlocked together to form tower 100 with a desired height $H_1$. Coupling mechanism 120 increases the surface area in contact between adjacent members and thus facilitates providing additional friction damping to tower 100 such that induced stresses within tower 100 are reduced during potential swaying due to weather conditions.

Figure 4:
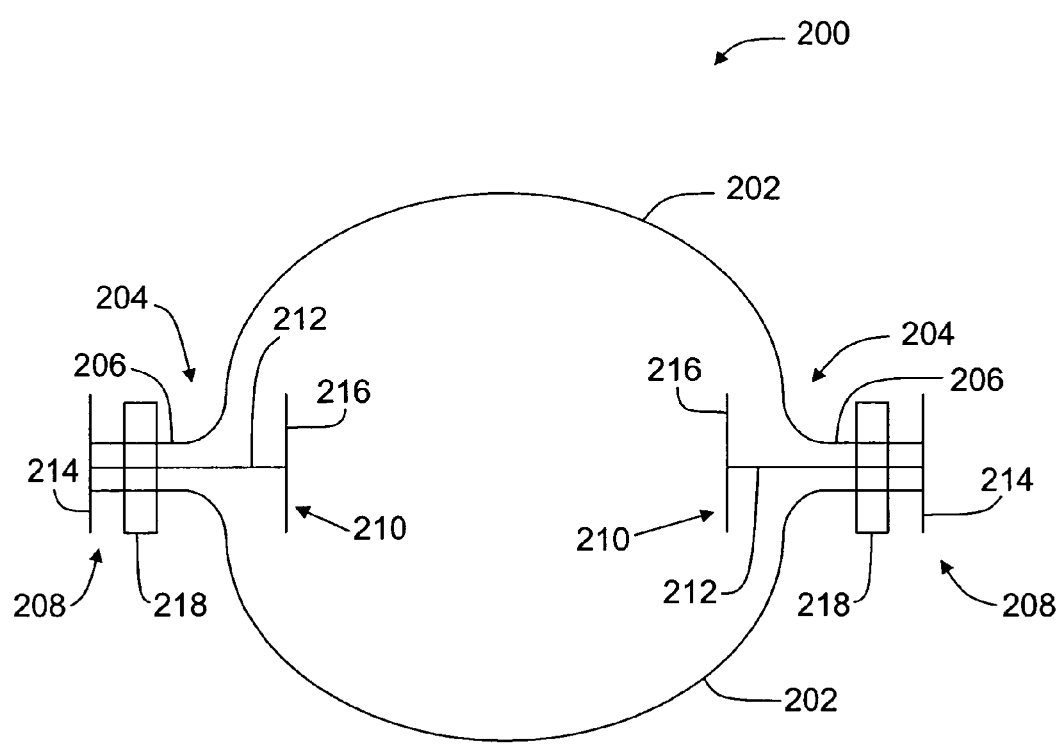
FIG. 4 is a top view of an exemplary tower member that may be used with the tower shown in FIG. 1.
Figure 5:
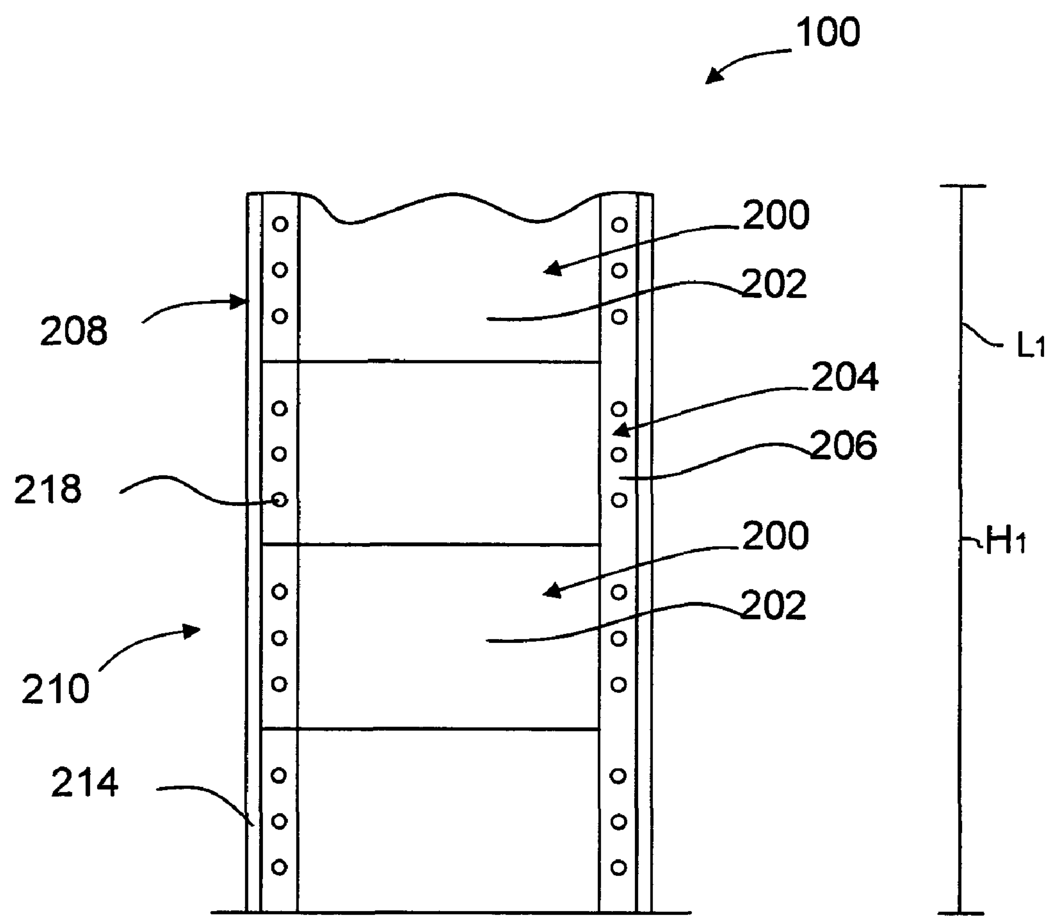
FIG. 5 is a schematic view of a portion of an exemplary wind turbine tower assembled using the tower members shown in FIG. 4.

FIG. 4 is a top view of an exemplary tower member 200 that may be used with tower 100. FIG. 5 is a schematic view of a plurality of tower members 200 coupled together to form a portion of a tower, such as tower 100. Although not shown in FIGS. 4 and 5, tower members 200 may incorporate coupling mechanism 120 (shown in FIGS. 2 and 3). In the exemplary embodiment, each tower member 200 includes two opposed arcuate sections 202 that are coupled together. In an alternative embodiment, tower member 200 may include more than two arcuate sections 202. Moreover, in alternative embodiments, tower member 200 is not circular, and includes a plurality of non-arcuate sections 202. Each section 202 includes two ends 204 that are each formed with a vertical flange 206 that extends generally radially therefrom. Sections 202 are oriented such that the flanges 206 from each are substantially aligned to form a joint 208.

In the exemplary embodiment, two H-beams 210 are coupled between sections 202. In an alternative embodiment, in which more than two sections 202 are utilized with member 200, more than two H-beams 210 are utilized. Specifically, one H-beam 210 is coupled within each joint 208 and more specifically, between each pair of flanges 206 to be coupled together. As such, a web portion 212 of each H-beam 210 extends between the two flanges 206 and is substantially flush against each flange 206. When coupled between flanges 206, a first H-beam flange 214 is positioned outwardly of tower member 200 and a second H-beam flange 216 is positioned within tower member 200. At least one bolt 218 is extended through each joint 208 such that the bolt 218 extends through each flange 206 and H-beam web portion 212 to couple tower member 200 to H-beams 210. Alternatively, H-beam 210 may be welded to flanges 206. Each H-beam 210 has a length $L_1$ that enables H-beam 210 to extend along a full height $H_1$ of tower 100.

Figure 6:
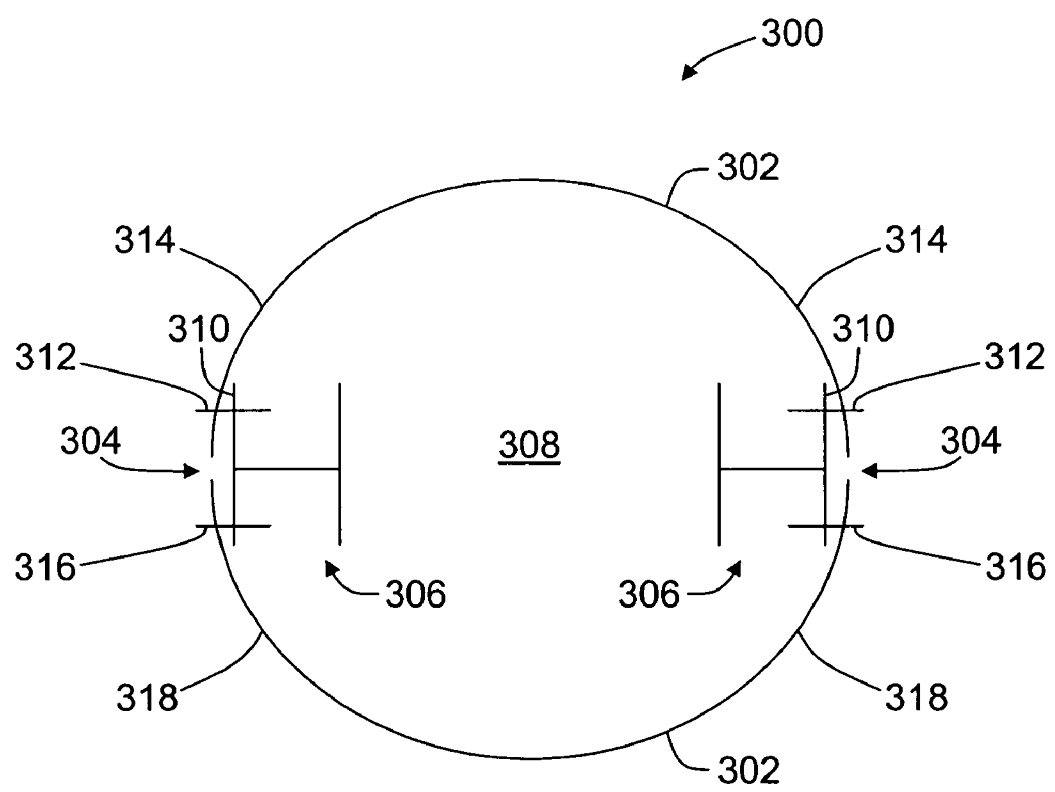
FIG. 6 is a top view of an alternative tower member that may be used with the tower shown in FIG. 1.

FIG. 6 is a top view of an alternative tower member 300 that may be used with tower 100. Although not shown in FIG. 6, tower member 300 may incorporate coupling mechanism 120 (shown in FIGS. 2 and 3). Tower member 300 includes two opposed arcuate sections 302 coupled together at joints 304 to form a substantially circular tower member 300. In an alternative embodiment, tower member 300 may include more than two arcuate sections 302. Moreover, in alternative embodiments, tower member 300 in not circular and includes a plurality of non-arcuate sections 302. In the exemplary embodiment, two H-beams 306 are coupled within an inner area 308 of tower member 300. In an alternative embodiment, in which than two sections 302 are utilized with member 300, more than two H-beams 306 are coupled within inner area 308. Specifically, one H-beam 306 is coupled to each joint 304 such that a flange 310 of H-beam 306 is substantially flush against joint 304.

At least one first bolt 312 is extended through joint 304 such that the at least one first bolt 312 extends through a first section 314 of joint 304 and H-beam flange 310, and at least one second bolt 316 is extended through joint 304 such that the at least one second bolt 316 extends through a second section 318 of joint 304 and H-beam flange 310. Alternatively, sections 302 may be welded to H-beam 306. As such, each section 302 of tower member 300 is coupled to an H-beam 306. Each H-beam 306 has a length that enables H-beam 306 to extend along a full height $H_1$ of tower 100.

Figure 7:
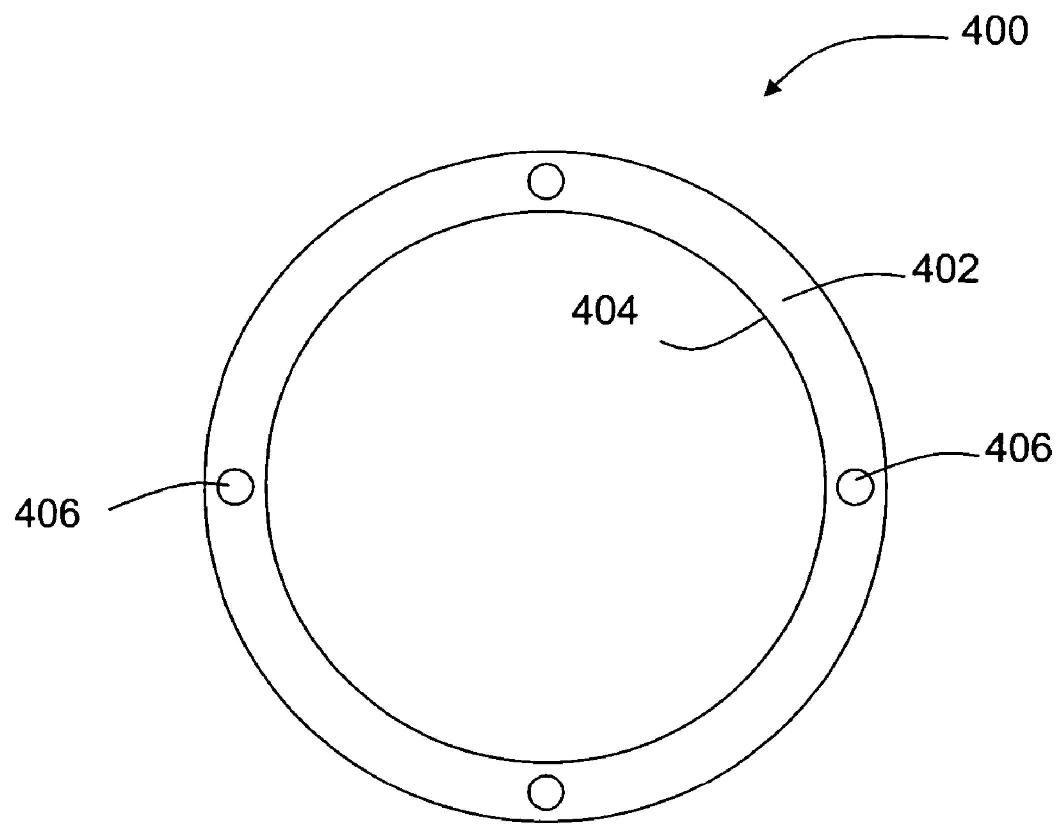
FIG. 7 is a top view of another alternative tower member that may be used with the tower shown in FIG. 1.
Figure 8:
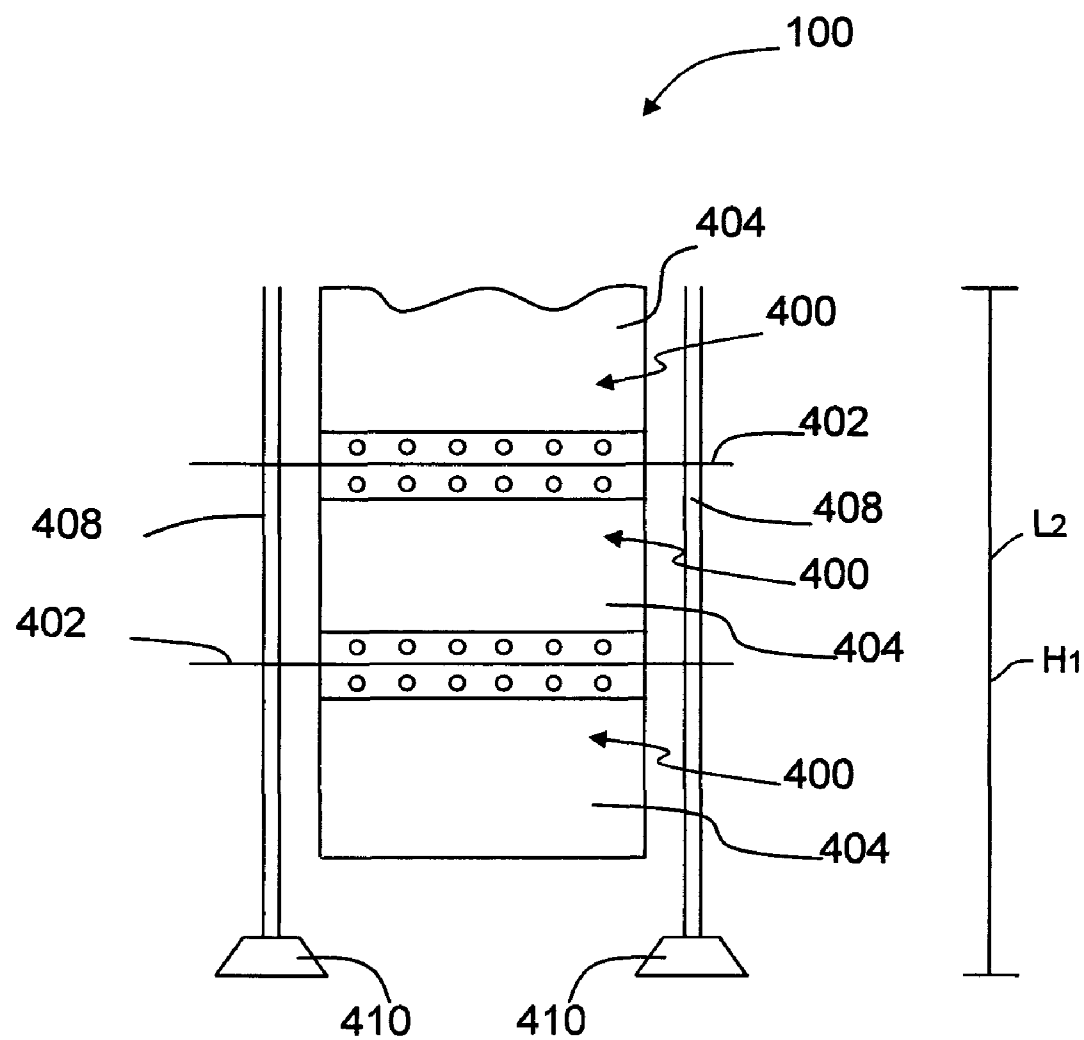
FIG. 8 is a schematic view of a portion of an exemplary wind turbine tower assembled using the tower members shown in FIG. 7.

FIG. 7 is a top view of another alternative tower member 400 that may be used with tower 100. FIG. 8 is a schematic view of a plurality of tower members 400 coupled together to form a portion of a tower, such as tower 100. Although not shown in FIGS. 7 and 8, tower members 400 may incorporate coupling mechanism 120 (shown in FIGS. 2 and 3). Tower member 400 includes a horizontal flange 402 that extends radially outward from and circumscribes a tower member outer surface 404. In an alternative embodiment, tower member 400 includes a plurality of horizontal flanges 402 that each extend radially outward from and partially circumscribe outer surface 404. In the exemplary embodiment, horizontal flange 402 is bolted to tower member 400. In an alternative embodiment, horizontal flange 402 is welded to tower member 400. In a further embodiment, horizontal flange 402 and tower member 400 are one unitary piece. Horizontal flange 402 includes at least one aperture 406 extending therethrough. In an alternative embodiment, in which more than one horizontal flange 402 is utilized, each horizontal flange 402 includes at least one aperture 406 extending therethrough.

A plurality of tower members 400 are coupled on top of one another as described above, such that tower 100 includes a plurality of horizontal flanges 402. Apertures 406 of each tower member 400 are aligned with apertures 406 of each adjacent tower member 400. Each of a plurality of support members 408 extends through an aperture 406 of each tower member 400. The exemplary embodiment includes two support members 408, however, alternative embodiments may include more or less than two support members 408. In the exemplary embodiment support members 408 are post-tensioned steel cables, however support members 408 are not limited to being post-tensioned steel cables. Support members 408 have a length $L_2$ that extends along a full height $H_1$ of tower 100, such that support members 408 facilitate coupling each tower member 400 to form a unitary tower 100. Furthermore, a tension of support members 408 can be adjusted for a specific geographic location. For example, less tension allows flexibility for towers 100 located in earthquake prone regions, and more tension allows for greater stability in hurricane prone regions.

At tower base 110, each support member 408 is coupled to a footer 410. The exemplary embodiment includes two footers 410 that are each coupled to one of the two support members 408. In alternative embodiments, in which more than two support members 408 are utilized with tower 100, more than two footers 410 may be used. Furthermore, each footer 410 may be formed to couple to more than one support member 408. Moreover, the exemplary embodiment includes cross-sectionally trapezoidal footers 410, however, in alternative embodiments, footers 410 may be any other shape suitable for supporting support members 408. In addition, tower 100 may include one footer 410 configured to couple to each support member 408. Footers 410 supply a bearing resistance for support members 408, however, in an embodiment wherein support members 408 are post-tensioned cables, footers 410 also supply a reaction force for the cables, in addition to providing the bearing resistance.

Figure 9:
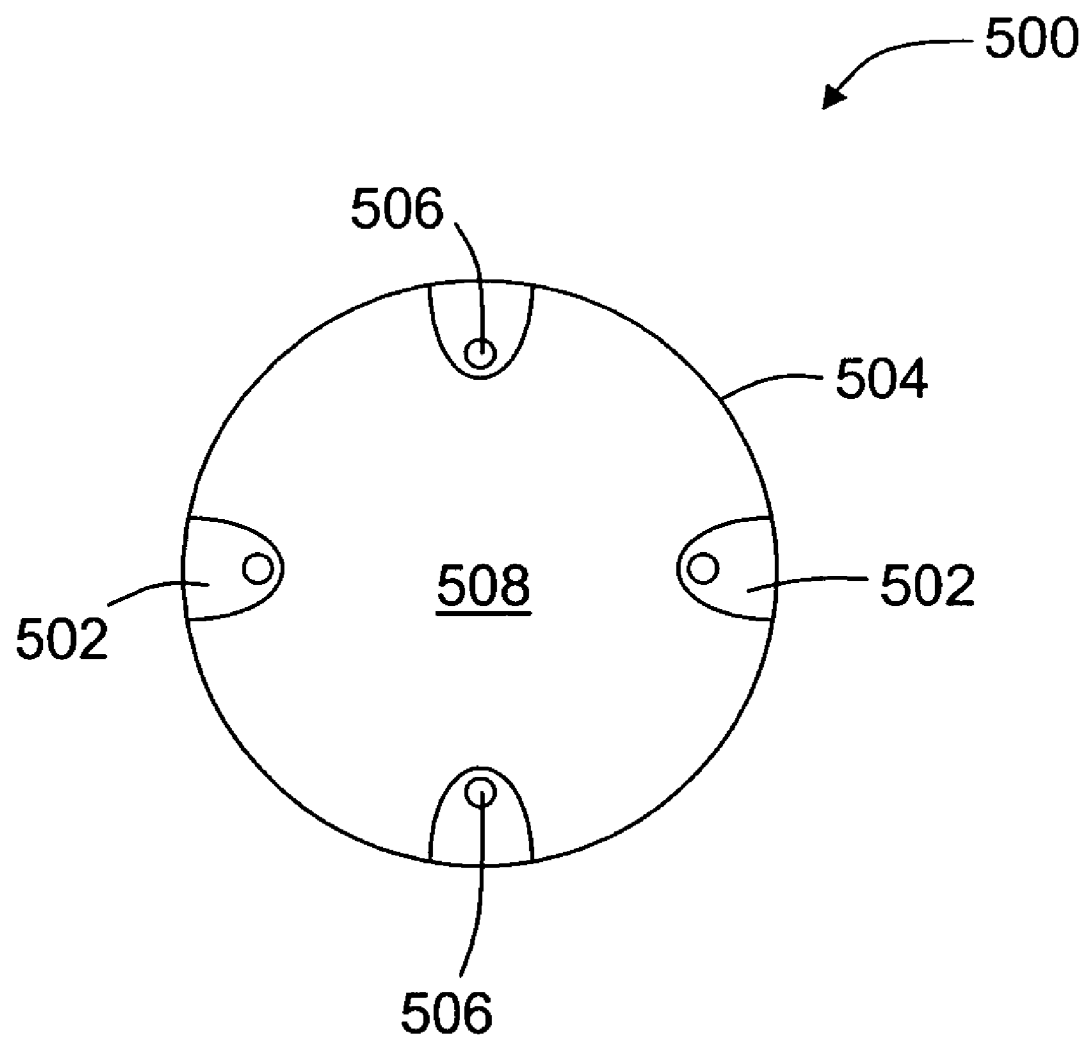
FIG. 9 is a top view of a further alternative tower member that may be used with the tower shown in FIG. 1.

FIG. 9 is a top view of a further alternative tower member 500 that may be used with tower 100. Although not shown in FIG. 9, tower member 500 may incorporate coupling mechanism 120 (shown in FIGS. 2 and 3). Tower member 500 includes a plurality of horizontal flanges 502 that extend radially inward from a tower member inner surface 504. In the exemplary embodiment, tower member 500 includes four horizontal flanges 502. In an alternative embodiment, tower member 500 includes more or less than four horizontal flanges 502. In a further alternative embodiment, tower member 500 includes one horizontal flange 502 that extends radially inward from and along a full circumference of inner surface 504. Each horizontal flange 502 includes at least one aperture 506 extending therethrough.

A plurality of tower members 500 are coupled on top of one another to form tower 100 as described above. Apertures 506 of each tower member 500 are aligned with apertures 506 of each adjacent tower member 500. Apertures 506 are configured to receive support members (not shown) in a similar fashion to apertures 406 (shown in FIGS. 7 and 8), such that the support members extend through an inner area 508 of tower members 500. Furthermore, the support members have a length that extends a full height $H_1$ of tower 100, such that the support members facilitate coupling each tower member 500 to form a unitary tower 100. At tower base 110 the support members are coupled to at least one footer (not shown) similar to footer 410 (shown in FIGS. 7 and 8). In the exemplary embodiment, each footer is positioned within inner area 508.

Figure 10:
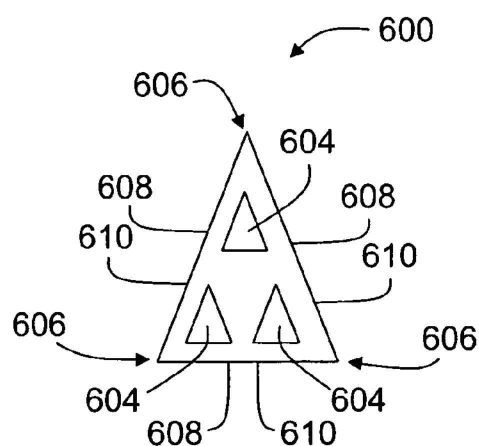
FIG. 10 is a top view of another alternative tower member that may be used with the tower shown in FIG. 1.
Figure 11:
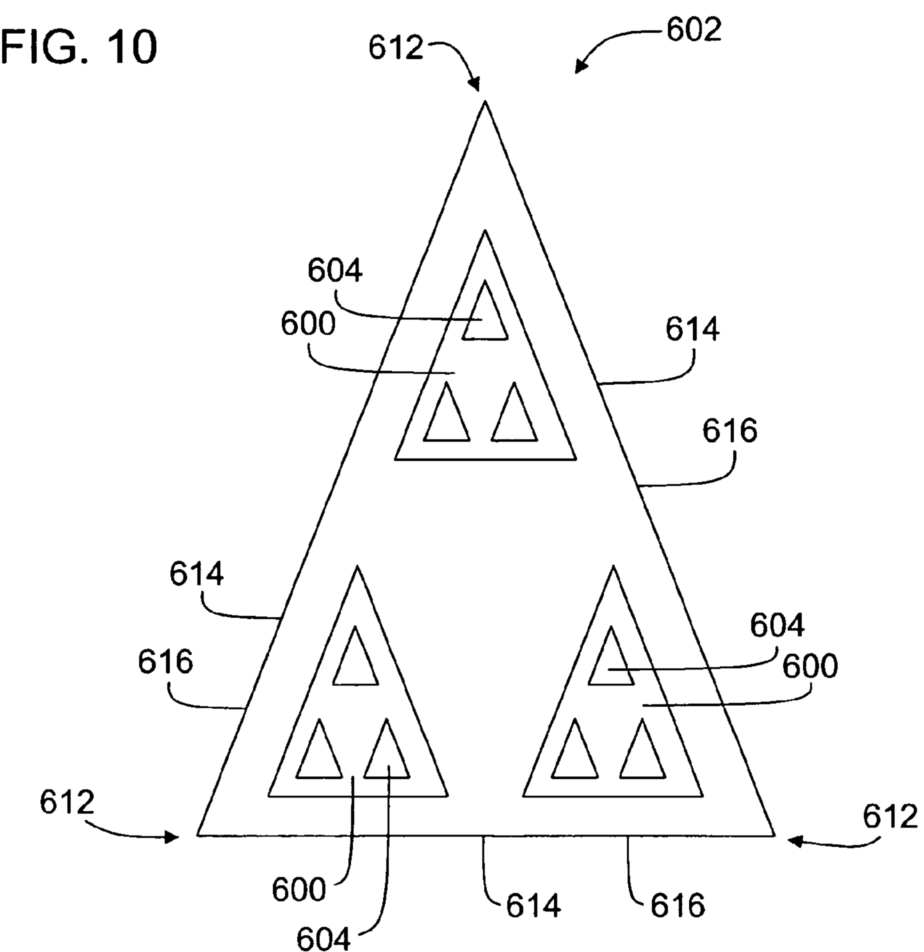
FIG. 11 is a top view of yet another tower member formed using the tower member shown in FIG. 10.

FIG. 10 is a top view of another alternative tower member 600 that may be used with tower 100. FIG. 11 is a top view of yet another tower member 602 formed using tower members 600. Tower members 600 are triangular in shape and configured to couple on top of other tower members 602 to form a tower, such as tower 100. Generally, a triangular shape provides a stability and resistance to buckling that is substantially similar to a stability and resistance to buckling that is provided by a circular member. Although not shown in FIG. 10, tower member 600 may incorporate coupling mechanism 120 (shown in FIGS. 2 and 3). Tower member 600 includes three smaller triangular members 604 that are each rolled from a flat stock. Specifically, each triangular member 604 defines a point 606 of tower member 600. Triangular members 604 are coupled together using three sections of flat stock 608, such that each section of flat stock 608 defines a side 610 of tower member 600. Alternatively, triangular members 604 are coupled together with a lacing to form tower member 600. In another alternative embodiment, triangular members 604 may be coupled together with a sheeting to form a smooth, solid, exterior facia. In this embodiment, the solid sheeting provides a shear panel in addition to more appealing aesthetics.

Tower member 602 is also triangular in shape and is formed using three tower members 600. Specifically, each tower member 600 defines a point 612 of tower member 602. Tower members 600 are coupled together using three sections of flat stock 614, such that each section of flat stock 614 defines a side 616 of tower member 602. Alternatively, tower members 600 are coupled together with a lacing to form tower member 602. In another alternative embodiment, triangular members 600 may be coupled together with a sheeting to form a smooth, solid, exterior facia. In this embodiment, the solid sheeting provides a shear panel in addition to more appealing aesthetics. Tower members 602 are configured to couple on top of other tower members 602 to form a tower, such as tower 100. Although not shown in FIG. 11, tower member 602 may incorporate coupling mechanism 120 (shown in FIGS. 2 and 3).

The method of using three triangular tower members to form the points of a larger triangular tower member can be carried out to any degree until a triangular tower member having a desired size is achieved.

The above-described method and apparatus facilitate reducing stress concentrations in a wind turbine tower. Specifically, the above-described method and apparatus facilitate reducing flexural stresses caused by high winds, and facilitate reducing high cycle vibrational flexural stresses caused by a weight of a turbine at the top of the tower. More specifically, the coupling mechanism described in FIGS. 2 and 3 increases the surface area in contact between adjacent tower members and thus facilitates providing damping to vibrations induced by wind-driven forces. The additional surface contact area allows for better load transfer between adjacent tower members. Furthermore, the tower members described in FIGS. 4-13 facilitate providing additional stability to the turbine tower by carrying tower loads in the support members and reducing stresses that winds and/or operation of the turbine may induce on the tower sections and joint welds. Moreover, the above-described method and apparatus provide a cost-efficient alternative to welding tower sections and reduce the amount of weld cracking which commonly occurs in welded tower sections.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Although the apparatus and methods described herein are described in the context of tower members for a wind turbine tower, it is understood that the apparatus and methods are not limited to tower members or wind turbine towers. Likewise, the wind turbine tower components illustrated are not limited to the specific embodiments described herein, but rather, components of the wind turbine tower can be utilized independently and separately from other components described herein.

While the invention has been described in terms of various specific embodiments, those skilled in the art will recognize that the invention can be practiced with modification within the spirit and scope of the claims.

What is claimed is:

1. A method of assembling a wind turbine tower, said method comprising:

providing a plurality of tower members, wherein each of the plurality of tower members has a top end and a radially extending protrusion extending from a bottom end;

coupling at least a first tower section to at least a second tower section to at least partially assemble the tower member;

coupling at least a first tower member to at least a second tower member to form the wind turbine tower with a substantially constant diameter, the wind turbine tower including a lower tower base and an opposite upper tower end, wherein the lower tower base is supported from a ground surface, the upper tower end extends a first height above the ground surface;

coupling the radially extending protrusion extending from the bottom end of the first tower member to the top end of the second tower member such that the top end of the second tower member is interlocked within at least a portion of the bottom end of the first tower member, and such that an inner surface of the first tower member bottom end protrusion contacts the outer surface of the second tower member to facilitate friction damping between adjacent tower members;

coupling the bottom end of the first tower member to the top end of the second tower member with at least one of a mechanical coupling and a weld;

coupling at least one flange to each of the plurality of tower members, wherein the at least one flange includes at least one aperture extending therethrough; and coupling at least one support member to each of the plurality of tower members such that the at least one support member extends through the at least one flange aperture, the at least one support member having a height that is approximately equal to the first height of the wind turbine tower.

2. The method in accordance with claim 1 further comprising coupling at least one bolt to the first tower member bottom end protrusion and the second tower member top end such that the at least one bolt extends through each of the first tower member bottom end protrusion and the second tower member top end.

3. The method in accordance with claim 1 further comprising coupling the at least one support member to an inner surface of each of the plurality of tower members.

4. The method in accordance with claim 3 further comprising coupling the at least one support member to the inner surface with at least one of a mechanical coupling and a weld.

5. The method in accordance with claim 1 further comprising coupling the at least one support member to a footer positioned near the lower tower base.

6. The method in accordance with 1 further comprising coupling the at least one support member along an outer surface of the plurality of tower members.

7. The method in accordance with claim 6 wherein the at least one flange substantially circumscribes the outer surface of each of the plurality of tower members.

8. A wind turbine tower comprising:

a plurality of tower members extending between an upper tower end and a lower base to form said wind turbine tower with a substantially constant diameter, wherein the lower base is supported from a ground surface, the upper tower end extends a first height above the ground surface;

said plurality of tower members each comprise at least a first tower section coupled to at least a second tower section;

said plurality of tower members each comprising a top end and a radially extending protrusion extending from a bottom end, said bottom end of a first tower member coupled to said top end of a second tower member such that said second tower member top end is interlocked within at least a portion of said first tower member bottom end protrusion such that an inner surface of said first tower member bottom end protrusion contacts said outer surface of said second tower member to facilitate friction damping between adjacent tower members, said first tower bottom end coupled to said second tower top end with at least one of a mechanical coupling and a weld;

a plurality of flanges coupled to each of said plurality of tower members, each of said plurality of flanges comprising at least one aperture extending therethrough; and at least one support member coupled to each of said plurality of tower members wherein said at least one support member extends through each of said flange apertures, said at least one support member extends from said lower base to said upper tower end and has a height that is approximately equal to said first height of said wind turbine tower.

9. The wind turbine tower in accordance with claim 8 further comprising at least one bolt coupled to said first tower member bottom end protrusion and said second tower member top end such that said at least one bolt extends through each of said first tower member bottom end protrusion and said second tower member top end.

10. The wind turbine tower in accordance with claim 8 wherein each of said plurality of tower members comprises an inner surface, said at least one support member coupled to said inner surface of each of said plurality of tower members.

11. The wind turbine tower in accordance with claim 10 wherein each of said plurality of flanges extends inwardly from said inner surface.

12. The wind turbine tower in accordance with claim 8 further comprising at least one footer positioned near said lower base, said at least one support member coupled to said footer.

13. The wind turbine tower in accordance with claim 8 wherein said at least one support member comprises a post-tensioned steel cable.

14. The wind turbine tower in accordance with claim 8 wherein each of said plurality of tower members comprises an outer surface, said at least one support member extends along said outer surface of said plurality of tower members.

15. The wind turbine tower in accordance with claim 14 wherein each of said plurality of flanges extends outwardly from said outer surface.

16. The wind turbine tower in accordance with claim 15 wherein said at least one flange substantially circumscribes said outer surface.

* * * * *

UNITED STATES PATENT AND TRADEMARK OFFICE

CERTIFICATE OF CORRECTION

PATENT NO. : 8,056,296 B2
APPLICATION NO. : 11/399829
DATED : November 15, 2011
INVENTOR(S) : Cairo It is certified that error appears in the above-identified patent and that said Letters Patent is hereby corrected as shown below:

In Claim 6, column 7, line 7, delete "in accordance with 1" and insert therefor -- in accordance with claim 1 --.
In Claim 8, column 8, lines 1 and 2, after "plurality of tower members" insert -- , --.
In Claim 16, column 8, line 36, delete "wherein said at least one flange" and insert therefor -- wherein at least one flange --.

Signed and Sealed this
Fourteenth Day of February, 2012

David J. Kappos
*Director of the United States Patent and Trademark Office*